US008801422B2

(12) United States Patent
Badin

(10) Patent No.: US 8,801,422 B2
(45) Date of Patent: Aug. 12, 2014

(54) MACHINE AND METHOD TO PRODUCE STRUCTURAL ELEMENTS FOR THE BUILDING TRADE MADE OF CEMENT MATERIAL, HAVING ONE OR MORE POLYMER MATERIAL INSERTS

(75) Inventor: Luciano Badin, Azzano Decimo (IT)

(73) Assignee: S.A.C.M.E. Srl, Azzano Decimo (PN) (IT)

( * ) Notice: Subject to any disclaimer, the term of this patent is extended or adjusted under 35 U.S.C. 154(b) by 641 days.

(21) Appl. No.: 12/670,211

(22) PCT Filed: Jul. 22, 2008

(86) PCT No.: PCT/EP2008/059590
§ 371 (c)(1),
(2), (4) Date: Jan. 22, 2010

(87) PCT Pub. No.: WO2009/013289
PCT Pub. Date: Jan. 29, 2009

(65) Prior Publication Data

US 2010/0225023 A1 Sep. 9, 2010

(30) Foreign Application Priority Data

Jul. 23, 2007 (IT) .............................. UD2007A0130

(51) Int. Cl.
*B28B 7/18* (2006.01)
*B28B 11/22* (2006.01)
*B28B 13/06* (2006.01)
*C04B 7/02* (2006.01)
*E04C 1/41* (2006.01)

(52) U.S. Cl.
USPC ........... 425/260; 425/361; 425/400; 425/414; 425/424; 425/431; 425/441; 425/456; 425/458; 425/467; 267/102; 267/113; 267/122; 267/136; 267/139; 267/140; 267/161; 267/165

(58) Field of Classification Search
CPC ............ B28B 7/16; B28B 7/18; B28B 11/22; B28B 13/06; B28B 19/003; B29C 33/72; C04B 7/02; E04C 1/41
USPC ......... 249/102–104, 112–113, 117, 119, 122, 249/124, 125, 139–140, 160, 165, 203, 136, 249/161; 264/333–334; 425/256, 258, 260, 425/361, 414, 421, 424, 432, 434, 431, 448, 425/456, 467, 398–400, 460, 389, 227, 441, 425/438
See application file for complete search history.

(56) References Cited

U.S. PATENT DOCUMENTS 2,413,109 A * 12/1946 Leipold et al. ................ 425/432
2,587,413 A * 2/1952 Vander Heyden ............ 425/413
(Continued)

FOREIGN PATENT DOCUMENTS

DE 1759181 3/1972
DE 3344519 A1 * 6/1985 ............. B28B 13/02
(Continued)

OTHER PUBLICATIONS

Translation of DE 4210994 A1.*

(Continued)

*Primary Examiner* — Dimple Bodawala
(74) *Attorney, Agent, or Firm* — Hamre, Schumann, Mueller & Larson, P.C.

(57) ABSTRACT

A machine and method to produce structural elements for the building trade made of cement material with one or more inserts made of polymer material. The machine comprises at least a molding member, a loading unit for loading the inserts and a depositing member to deposit the cement material. The molding member is open at the upper part and the loading unit and the depositing member are selectively positionable above the molding member in order to load and deposit from above, respectively, the inserts and the cement material into the molding member, in order to achieve the structural elements.

9 Claims, 8 Drawing Sheets

(56) References Cited

U.S. PATENT DOCUMENTS

| | | | | |
|---|---|---|---|---|
| 2,598,254 | A * | 5/1952 | Grueneberg | 425/361 |
| 2,708,783 | A * | 5/1955 | Ripley | 264/71 |
| 2,778,088 | A * | 1/1957 | Sterrett | 264/162 |
| 2,859,502 | A * | 11/1958 | Brown, Jr. | 425/139 |
| 3,522,336 | A * | 7/1970 | Locke et al. | 264/71 |
| 3,663,137 | A * | 5/1972 | Haas et al. | 425/148 |
| 3,669,597 | A * | 6/1972 | Schenider et al. | 425/216 |
| 3,989,432 | A * | 11/1976 | Depka | 425/139 |
| 4,050,865 | A * | 9/1977 | Drostholm et al. | 425/183 |
| 4,265,609 | A * | 5/1981 | Kitahara | 425/260 |
| 4,321,028 | A * | 3/1982 | Van de Caveye | 425/217 |
| 4,360,333 | A * | 11/1982 | Fox et al. | 425/299 |
| 4,445,839 | A * | 5/1984 | Crane | 425/421 |
| 4,478,021 | A * | 10/1984 | Person | 52/375 |
| 4,695,418 | A * | 9/1987 | Baker et al. | 264/151 |
| 4,802,836 | A * | 2/1989 | Whissell | 425/253 |
| 5,002,711 | A * | 3/1991 | Iwama et al. | 264/71 |
| 5,056,998 | A * | 10/1991 | Goossens | 425/130 |
| 5,066,440 | A * | 11/1991 | Kennedy et al. | 264/69 |
| 5,074,774 | A * | 12/1991 | Nose et al. | 425/148 |
| 5,219,591 | A * | 6/1993 | Allison et al. | 425/260 |
| 5,281,125 | A * | 1/1994 | Gebhardt | 425/253 |
| 5,775,047 | A * | 7/1998 | Jensen | 52/596 |
| 6,159,401 | A * | 12/2000 | Hoesch | 264/69 |
| 6,352,236 | B1 * | 3/2002 | Aaseth et al. | 249/119 |
| 6,513,293 | B2 * | 2/2003 | Miller | 52/405.1 |
| 6,616,874 | B1 * | 9/2003 | Lazar | 264/71 |
| 7,140,869 | B2 * | 11/2006 | Toncelli | 425/449 |
| 7,179,077 | B2 * | 2/2007 | Chennells | 425/255 |
| 7,572,048 | B2 * | 8/2009 | Morey et al. | 366/16 |
| 7,942,658 | B1 * | 5/2011 | Jensen | 425/4 R |
| 7,992,837 | B2 * | 8/2011 | Davies et al. | 249/162 |
| 2004/0130047 | A1 * | 7/2004 | Skidmore et al. | 264/35 |
| 2006/0080938 | A1 * | 4/2006 | Rothdach et al. | 52/749.13 |
| 2008/0174041 | A1 * | 7/2008 | Firedman et al. | 264/71 |

FOREIGN PATENT DOCUMENTS

| | | | | | |
|---|---|---|---|---|---|
| DE | 3610782 | A1 * | 10/1987 | B28B 13/02 |
| DE | 4210994 | A1 * | 10/1993 | B28B 21/28 |
| DE | 4210994 | A1 * | 5/1997 | B28B 21/28 |
| DE | 10361460 | | 6/2005 | |
| DE | 102004063903 | * | 10/2005 | B28D 1/30 |
| EP | 140721 | A1 * | 5/1985 | B28B 7/00 |
| EP | 174882 | A1 * | 3/1986 | E04C 1/40 |
| EP | 358440 | A2 * | 3/1990 | C04B 40/00 |
| EP | 610529 | A1 * | 8/1994 | B28B 7/24 |
| FR | 2590834 | A1 * | 6/1987 | B28B 3/02 |
| FR | 2661361 | A1 * | 10/1991 | B28B 3/12 |
| GB | 2115466 | A * | 9/1983 | E01C 19/40 |
| JP | 63302005 | A * | 12/1988 | B28B 3/02 |
| JP | 01156012 | A * | 6/1989 | B28B 13/02 |
| JP | 04064406 | A * | 2/1992 | B28B 3/02 |
| JP | 11042627 | A * | 2/1999 | B28B 11/08 |
| JP | 11071899 | A * | 3/1999 | E04G 19/00 |
| JP | 2002021064 | A * | 1/2002 | E02D 5/18 |

OTHER PUBLICATIONS

Translation of JP 11-071899.*

* cited by examiner

MACHINE AND METHOD TO PRODUCE STRUCTURAL ELEMENTS FOR THE BUILDING TRADE MADE OF CEMENT MATERIAL, HAVING ONE OR MORE POLYMER MATERIAL INSERTS

FIELD OF THE INVENTION

The present invention concerns a machine, and the relative method, to produce structural elements for the building trade, such as for example bricks, blocks or similar artifacts made of cement, provided with one or more inserts of polymer material, such as polystyrene or similar insulations.

BACKGROUND OF THE INVENTION

Machines are known for the automatic or semi-automatic production of structural elements for the building trade made of cement material and provided with inserts of polystyrene, such as blocks or bricks, having good characteristics of lightness and heat insulation.

Known machines provide a mold which is closed at the top, inside which the polystyrene inserts are previously loaded, by abutment insertion from below. Insertion from below entails considerable mechanical and operational complications for the machine.

The mold is then closed on its lower side by means of a plate, so as to define one or more closed molding compartments and to clamp the polystyrene inserts in height inside the relative compartments.

Finally, known machines provide to make a cast of cement material inside the closed molding compartments, so as to define an equal number of structural elements, each incorporating a relative polystyrene insert.

The known solution, since it has to define closed compartments of a predefined height in order to guarantee uniformity in height of the structural elements, causes a considerable increase in production times, with the need to provide a pressurized cast of cement material inside the compartments.

Furthermore, if the polystyrene insert includes undercut insertions and/or shapings, such as for example dove-tailed ribs or suchlike, the cast does not ensure the complete and correct penetration of the cement material into all the interstices defined, thus considerably lowering the quality of the final product. Therefore, it is known to provide high pressure casts and/or repeated casts, with a consequent increase in both production times and costs, without in any case obtaining a totally satisfactory result.

Purpose of the present invention is to achieve a machine, and perfect a method, that allow to achieve structural elements for the building trade with one or more polymer inserts, simply and effectively, reducing both times and costs of production with respect to state of the art machines. The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

A machine to produce structural elements for the building trade made of cement material with one or more polymer inserts according to the present invention comprises at least a molding member, means to load the polymer inserts, and means to deposit the cement material.

In accordance with the above purpose, the molding member is open at the top, whereas the loading means and the depositing means are selectively positionable above the molding member, in order to load and deposit from above into the molding member, respectively, the polymer inserts and the cement material, so as to make the structural elements.

Advantageously, but not restrictively, the molding member is selectively able to be closed at the bottom by means of a closing and vibrating element in order to promote the complete penetration from above of the cement material, also if the inserts have undercut shapings with grooves and/or ribs with interstices.

With the present invention we therefore have the molding member which is always open towards the top, so as to allow the simple and rapid insertion from above of the inserts and the depositing of the cement material, without entailing impediments or mechanical complications.

Furthermore, the selective movement of the loading means and the depositing means above the molding member, together with the insertion from above of the inserts and of the cement material, allows to optimize the production cycle of the machine according to the invention, compared with known machines. In fact, with the machine according to the present invention it is possible to simultaneously perform the operations of depositing the cement material and of making the structural elements.

According to a variant, the machine comprises at least a leveling element able to be moved on a plane above the molding member in order to uniformly level the upper surface of the structural elements made.

In this way, to guarantee uniformity in height, it is not necessary to define closed compartments of the mold, but the definitive height of the structural elements is defined by the passage of the leveling element on the upper surface of the structural elements themselves.

Advantageously, the leveling element is adjusted in such a manner as to level the part of cement material substantially level with the upper surface of the polymer inserts.

According to a variant, the leveling element includes adjustment means able to allow a desired adjustment in height thereof.

According to another variant, the leveling element is mounted on a mobile frame of the depositing means, so that, while the latter is removed from its position above the molding member, the leveling element levels the structural elements made. This solution allows to optimize the times and operating cycle of the machine according to the present invention.

According to another variant, the machine comprises a thruster member disposed above and coaxial to the molding member, which thrusts the polymer inserts from above downward, from the loading means to inside the molding member.

According to another variant, the loading means is selectively movable between a first inactive position in which it is suitable to accommodate the polymer inserts, and a second operating position in which it is above the molding member and allows to load the polymer inserts inside the molding member.

According to another variant, the depositing means is selectively movable between a first inactive position in which it is filled, for example by means of a hopper, with cement material, and a second operating position in which it is above the molding member and allows to deposit the cement material inside the molding member.

According to another variant, the loading means and the depositing means are alternately movable along the same plane above the molding member, so that, while the first is in the operating position above the molding member, the other is in the inactive position so as to be reloaded.

According to another variant, the machine comprises movement means associated with the molding member and able, when molding is terminated, to move the molding member downward so as to allow the structural elements formed to be deposited on the ground.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL FORM OF EMBODIMENT

Figure 8:
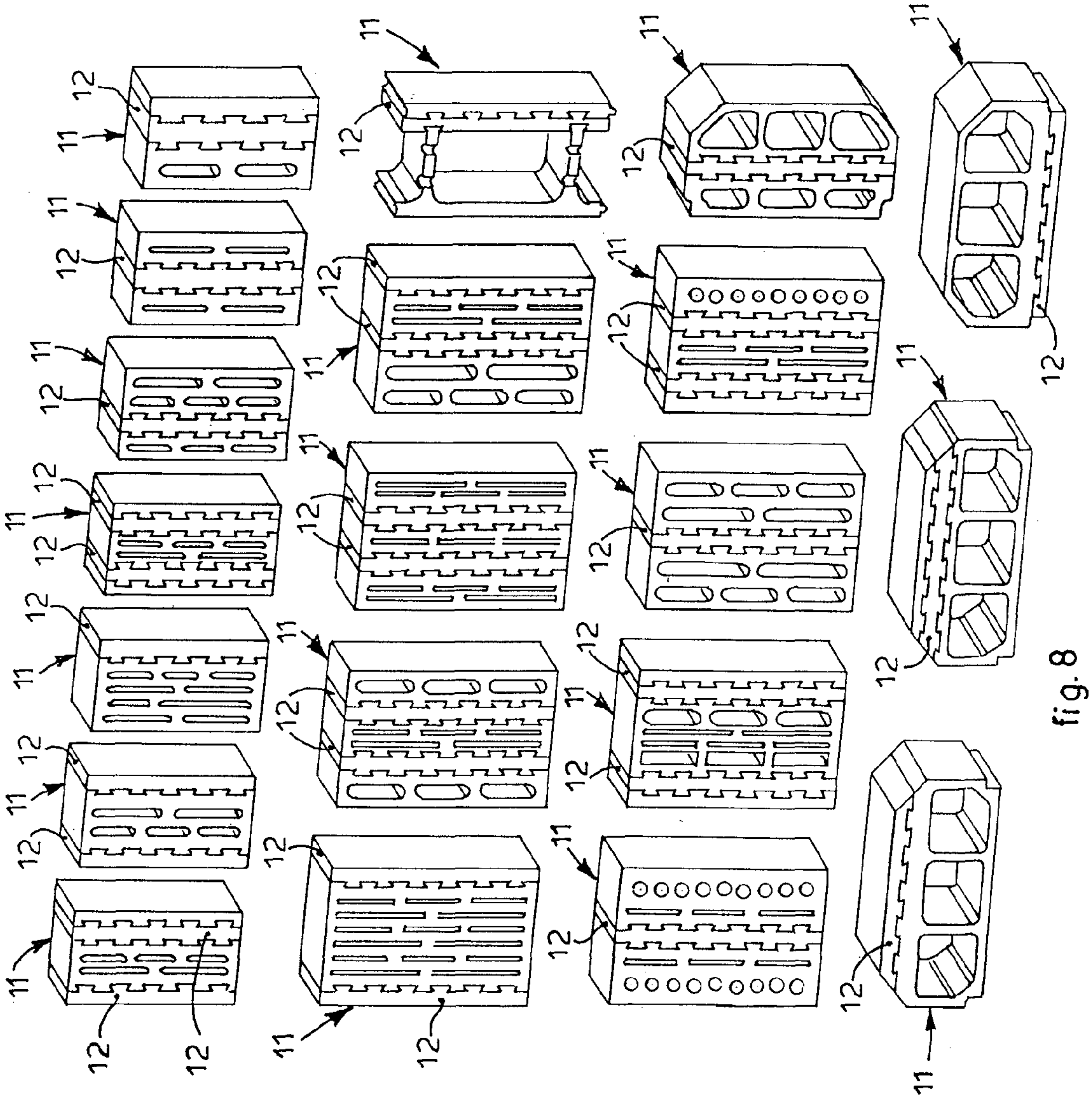
FIG. 8 shows some types of structural elements made with the machine in FIG. 1.

With reference to the attached drawings, the reference number 10 indicates in its entirety a machine to produce structural elements 11 made of cement material having one or more inserts 12 of polymer material, in this case polystyrene. FIG. 8 shows some examples of structural elements 11 with an insert 12 made with the machine 10 according to the present invention.

In this case the machine 10 is of the type with step-wise advance, in which, after a first group of structural elements 11 has been made, the machine 10 deposits the structural elements 11 on the ground and is moved forward by one step.

Figure 1:
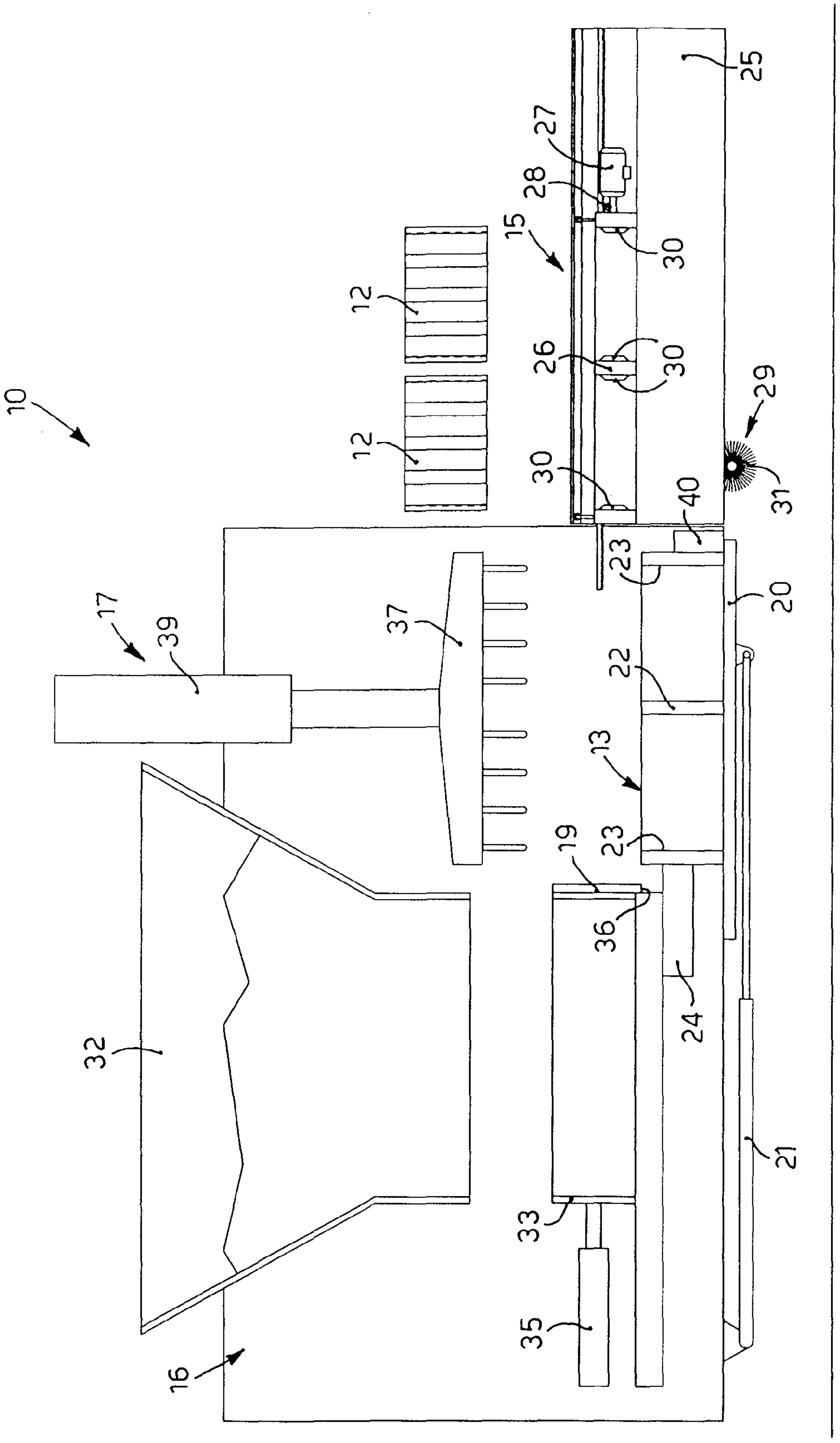
FIG. 1 is a schematic view of a longitudinal section of the machine according to the invention in a first operating condition.

The machine 10 substantially comprises (FIGS. 1 and 2) a mold 13 to mold the structural elements 11, a mobile loader 15 for the inserts 12, a depositing member 16 for the cement material, a thruster unit 17 to position the inserts 12 in the mold 13, and a level 19 to scrape the structural elements 11 already formed.

The mold 13 is open at the top and can be selectively closed from the lower side by means of a plate 20, movable by means of an actuator 21.

The mold 13 comprises inside a plurality of dividing walls 22 able to define, in combination with each other, a plurality of molding sectors 23, with a shape and size corresponding to the structural elements 11 to be made.

The mold 13 also comprises a vibration unit 24 which determines alternate oscillations of the mold 13, so as to promote the complete and uniform depositing of the cement material inside the molding sectors 23, and close to the inserts 12.

The mobile loader 15 comprises a structure 25 on which a positioning tray 26, a drive unit 27 and a surface finishing unit 29 for the structural elements 11 formed are mounted.

The positioning tray 26 is open both at the top, and also at the bottom, and comprises inside it a plurality of positioning elements 30 with respect to which the inserts 12 are able to be positioned so as to assume and maintain the correct loading position in the mold 13. The positioning tray 26 is also mounted sliding with respect to the structure 25 along an upper plane with respect to the mold 13.

In particular, the positioning tray 26 is selectively movable by the drive member 27 between a first inactive position, in which it is closed from below by the structure 25, and inside it the inserts 12 are positioned by loading from above with respect to the positioning elements 30; and a second operating position in which it is open at the bottom and is above the mold 13, in order to allow the inserts 12 to be loaded into the latter from above.

In this case, the drive member 27 provides a thrust rack 28, constrained directly to the positioning tray 26 so as to actuate the movement thereof from one to the other of the above two positions.

The surface finishing unit 29 is mounted on the lower part of the structure 25 and substantially comprises a rotary brush 31, which is able to brush the upper surface of the structural elements 11 made, so as to define a surface finishing thereof. The rotary brush 31 can be made substantially of any material, such as for example metal, plastic or other, having sufficient mechanical characteristics of abrasion for cement and polystyrene.

The depositing member 16 comprises a hopper 32 and a mobile frame 33, and is disposed in a position substantially opposite the mobile loader 15, with respect to the mold 13.

The hopper 32 is of a substantially traditional type and will not be described in detail here.

The mobile frame 33 is substantially co-planar with the positioning tray 26 and is open both at the bottom and at the top. The mobile frame 33 is selectively movable by means of a relative actuator 35 between a first inactive position in which it is closed at the bottom and is under the hopper 32 so as to be loaded with a determinate quantity of cement material, and a second operating condition in which it is open at the bottom and is above the mold 13, so as to allow the cement material to be deposited into the latter from above.

Advantageously, in this second operating position of the mobile frame 33, the vibration unit 24 determines the vibration of the mold 13.

In this case, the level 19 is mounted on one side of the mobile frame 33 and protrudes below it, with its scraping edge 36, so as to graze the upper surfaces of the inserts 12 positioned in the mold 13.

In this way, when the mobile frame 33 is taken from its second operating position to its first inactive position, the scraping edge 36 moves in co-planar manner above the mold 13 so as to level the upper surfaces of the structural elements 11, still in the mold 13, and level the part of cement material to the height of the inserts 12.

Advantageously, the level 19 is mounted in adjustable manner on the mobile frame 33, so as to be able to vary the operating depth thereof, according to the actual height of the inserts 12.

The thruster unit 17 is disposed above and coaxial with the mold 13 in a raised position with respect to the plane on which the positioning tray 26 and the mobile frame 33 are moved, so that the latter, in the respective operating positions, are interposed in height between the mold 13 and the thruster unit 17.

The thruster unit 17 comprises a comb element 37 movable vertically by means of a vertical actuator 39, and able to selectively thrust the inserts 12 from above downward, with the positioning tray 26 in its second operating position, inside the respective molding sectors 23 of the mold 13.

The thruster unit 17 is also able to accompany the release movement of the structural elements 11 at the end of their molding in the mold 13.

In this case, the machine 10 comprises a movement unit 40, shown only schematically in the drawings, which is associated with the mold 13 so as to determine the vertical movement thereof towards the ground, at the end of molding of the structural elements 11. In this way, the structural elements 11 are carefully deposited on the ground, substantially without suffering any damage and maintaining a desired orderly disposition.

The machine 10 as described heretofore functions as follows.

The machine 10 initially (FIG. 1) has the positioning tray 26 and the mobile frame 33 in the respective first inactive positions, and the mold 13 closed at the bottom by the plate 20.

Figure 2:
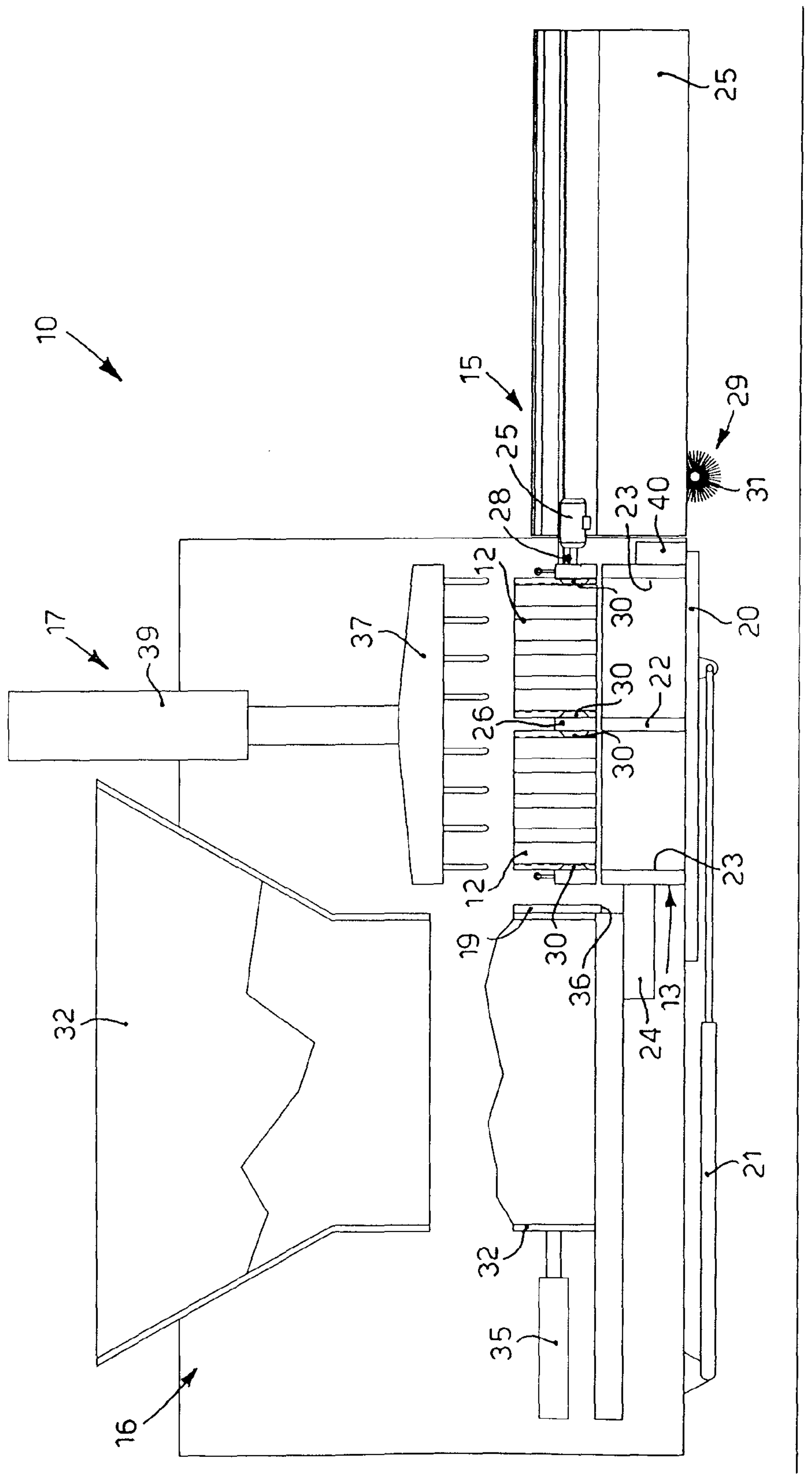
FIG. 2 is a schematic view of a longitudinal section of the machine in FIG. 1 in a second operating condition.

Then the inserts 12 are loaded between the positioning elements 30 of the positioning tray 26, while the hopper 32 is loaded with the cement material which is then deposited in the mobile frame 33 (FIG. 2).

Subsequently, the positioning tray 26 is taken to its second operating position above the mold 13.

Figure 3:
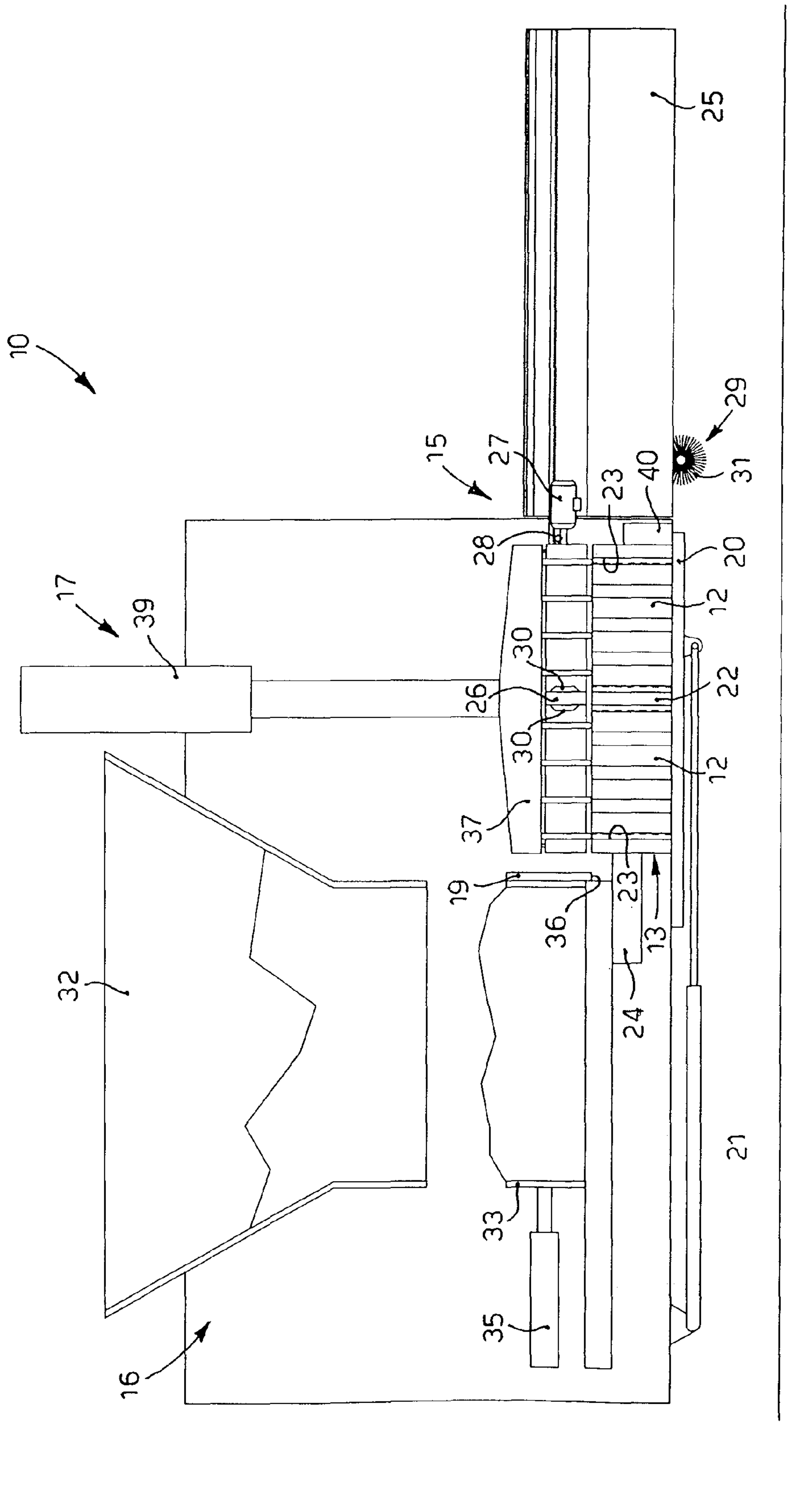
FIG. 3 is a schematic view of a longitudinal section of the machine in FIG. 1 in a third operating condition.

Then the thruster unit 17 is activated (FIG. 3), so that the comb element 37 thrusts the structural elements 11 from above downward, inserting them into the respective molding sectors 23.

Then the positioning tray 26 and the mobile frame 33 are moved simultaneously, the first towards its first inactive position and the second towards its second operating position.

Figure 4:
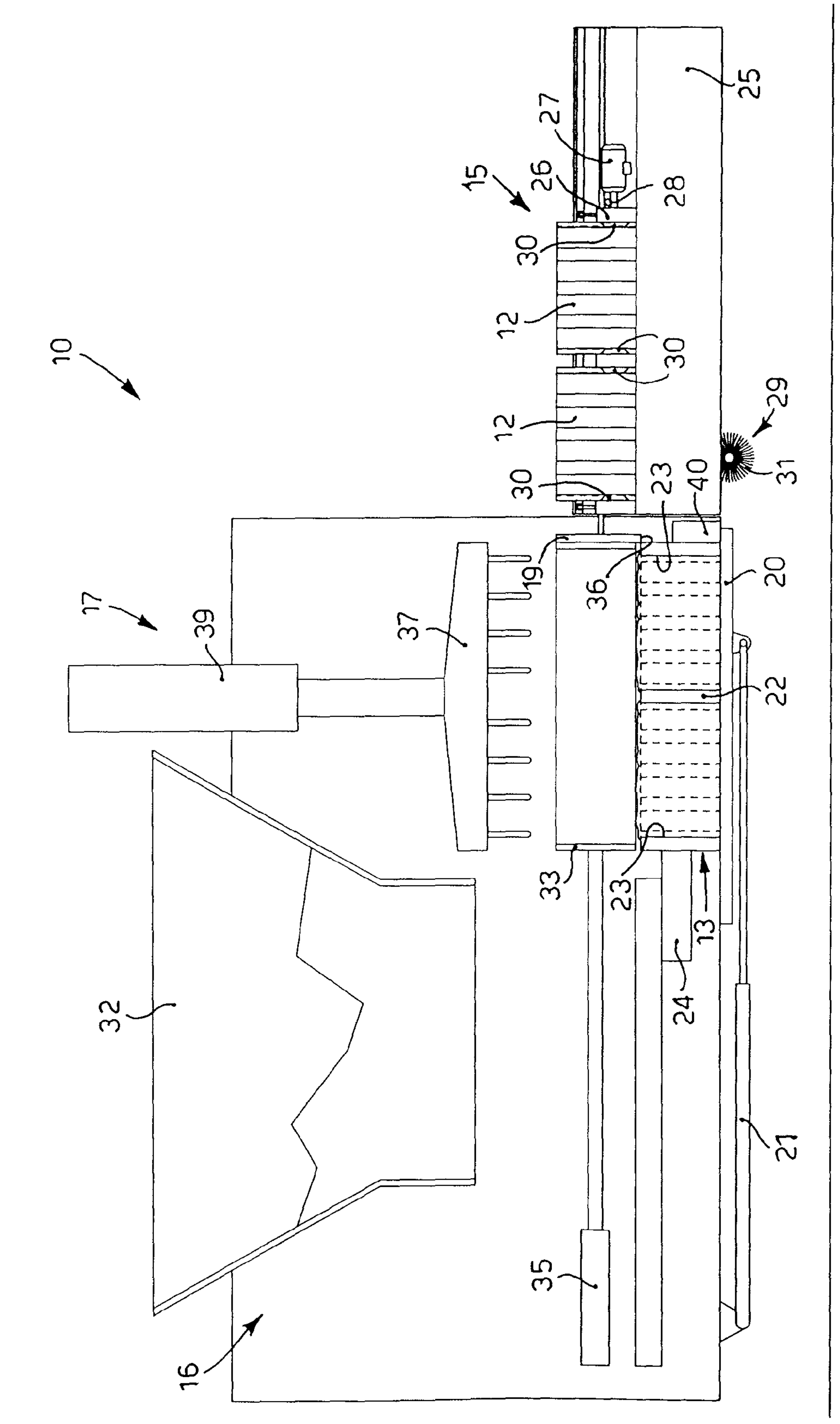
FIG. 4 is a schematic view of a longitudinal section of the machine in FIG. 1 in a fourth operating condition.

In this condition, the mobile frame 33 deposits the cement material in the mold 13 (FIG. 4), while the positioning tray 26 is loaded with more inserts 12.

The depositing of the cement material in the mold 13 is facilitated by the vibration performed by the vibration unit 24, so as to facilitate its compacting and penetration into the interstices defined by the shape of the inserts 12.

Figure 5:
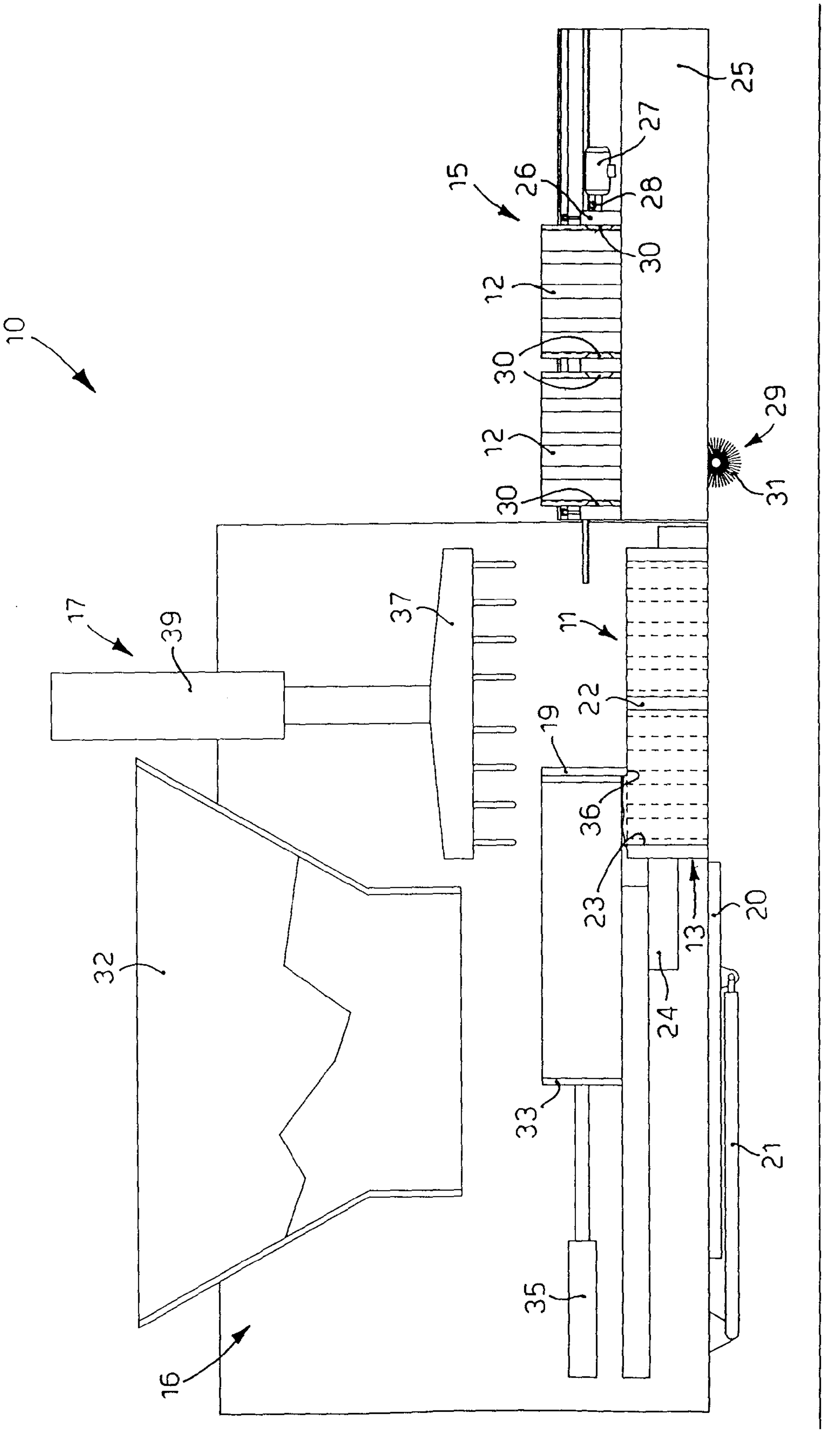
FIG. 5 is a schematic view of a longitudinal section of the machine in FIG. 1 in a fifth operating condition.

Then the mobile frame 33 is returned to its first inactive position. As we said, in this step the level 19 scrapes the surface of the structural elements 12 (FIG. 5) in the mold 13 in order to level the height thereof.

Figure 6:
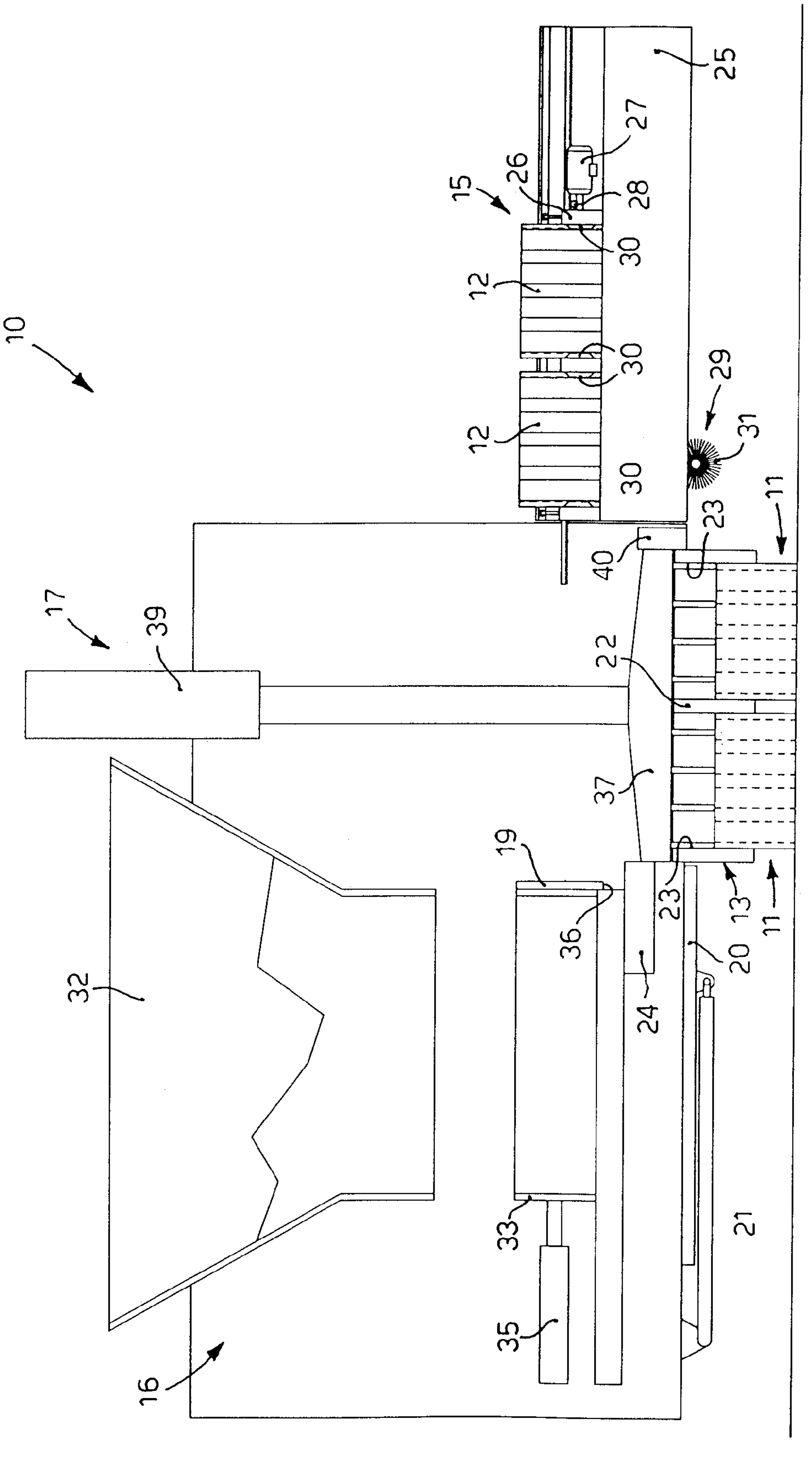
FIG. 6 is a schematic view of a longitudinal section of the machine in FIG. 1 in a sixth operating condition.

The mold 13 is then moved towards the ground by the movement unit 40, and the comb element 37 is lowered, so as to determine the separation of the structural elements 11 from the mold 13 (FIG. 6), and deposit them on the ground.

Figure 7:
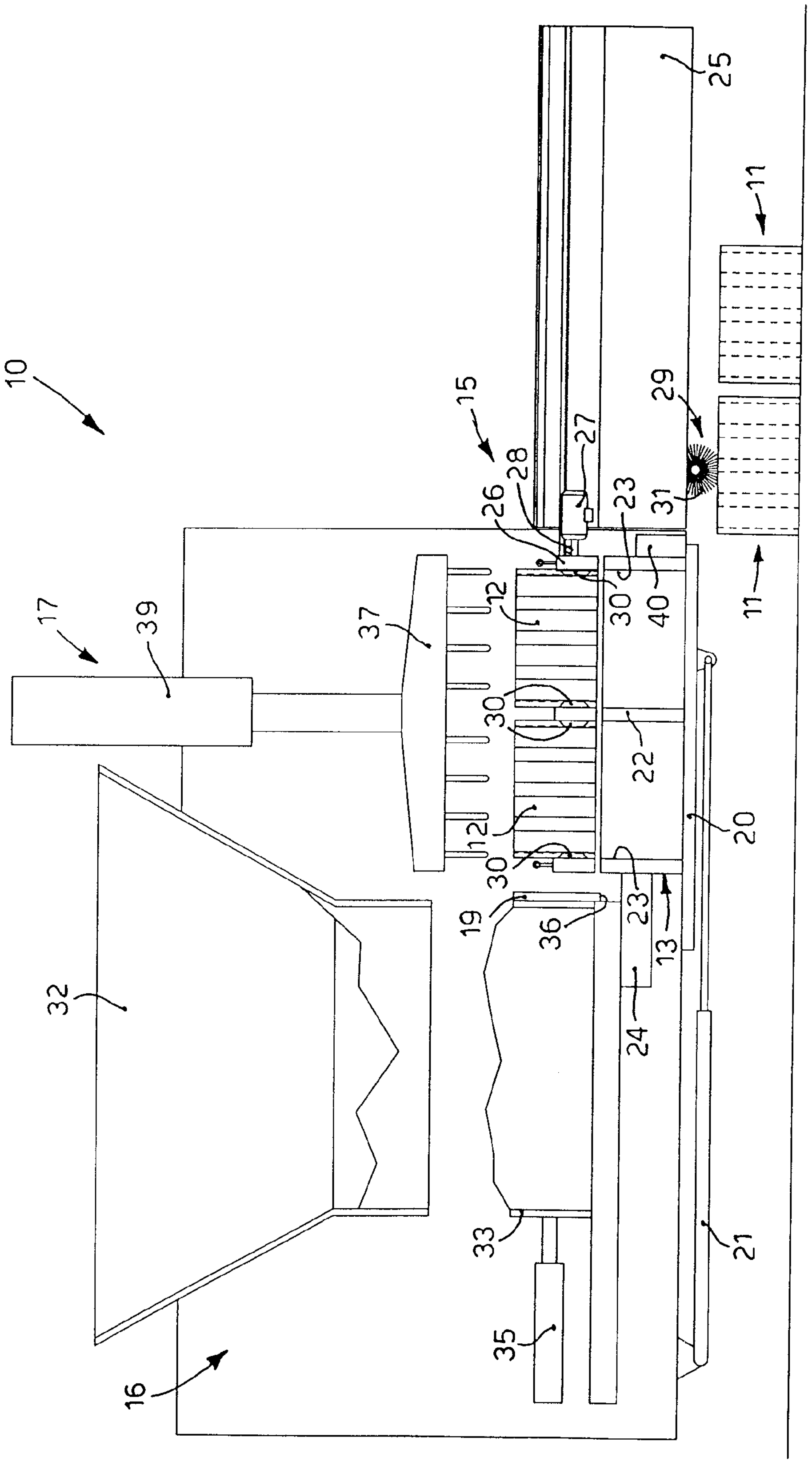
FIG. 7 is a schematic view of a longitudinal section of the machine in FIG. 1 in a seventh operating condition.

The machine 10 then advances by one step and the above operating cycle is repeated (FIG. 7). During the advance of the machine 10, the structural elements 11 just formed are surface finished by the rotary brush 31.

It is clear, however, that modifications and/or additions of parts may be made to the machine 10 and the method as described heretofore, without departing from the field and scope of the present invention.

For example, it comes within the field of the present invention to provide that the level 19 is associated with relative drive members, so as to be moved independently with respect to the mobile frame 33.

It is also clear that, although the present invention has been described with reference to specific examples, a person of skill in the art shall certainly be able to achieve many other equivalent forms of machine and method to produce structural elements made of cement material having one or more inserts of polymer material, having the characteristics as set forth in the claims and hence all coming within the field of protection defined thereby.

The invention claimed is:

1. A machine to produce structural elements for building trade, the structural elements being made of cement material with one or more inserts made of polymer material, said machine moving in step wise advance, said machine comprising: a molding member open at a top side and selectively opened and closed from a lower side by a movable plate, said movable plate being movable by means of an actuator;

a loader for said inserts;

a rotary brush connected to said loader at a lower part of said loader and able to brush an upper surface of the structural element when said structural element deposited on a ground;

a depositing member for said cement material;

wherein said loader and said depositing member are selectively and alternately positionable above said molding member by respective drive members configured to move the depositing member and the loader on a plane above said molding member, from respective inactive positions to respective operating positions, in order to load and deposit from above, respectively, said inserts and said cement material into said molding member, in order to achieve said structural elements, wherein said loader includes a movable positioning tray, the movable positioning tray having inside it a plurality of positioning elements for the inserts, open both at a top and also at a bottom, selectively movable between a first inactive position and a second inactive position, the first inactive position having the bottom closed to contain the inserts which are loaded from above inside said positioning elements, and the second operating position in which the movable positioning tray is open at the bottom and the movable positioning tray is above said molding member, in order to allow the inserts to be loaded into the molding member from above; and a thruster unit located above the molding member and fitted with a comb element that positions the inserts inside the molding member when the positioning tray is above the molding member, wherein after a first group of said structural elements has been formed, the movable plate is opened, and the structural elements are deposited on the ground, and thereafter, the machine advances one step, and during the advancement of the machine one step, the structural elements are surface finished by the rotary brush.

2. The machine as in claim 1, wherein said depositing member is selectively movable between a first inactive position in which the depositing member is filled with said cement material, and a second operating position in which the depositing member is above the molding member and allows to deposit said cement material inside said molding member.

3. The machine as in claim 1, wherein said loader and said depositing member are reciprocally conformed to be able to be moved substantially along the same plane above the molding member.

4. The machine as in claim 1, further comprising a leveling element able to be moved on a plane above said molding member in order to uniformly level the upper surface of said structural elements.

5. The machine as in claim 4, wherein said leveling element is associated with said depositing member.

6. The machine as in claim 4, wherein said leveling element includes a level having a scraping edge, the level being adjustably mounted on a mobile frame of the depositing member.

7. The machine as in claim 1, wherein said molding member is selectively made to vibrate by a vibrating unit, to facilitate the complete penetration from above of the cement material.

8. The machine as in claim 1, further comprising a movement unit associated with the molding member to determine a selective movement thereof downward, in order to deposit the structural elements formed.

9. The machine as in claim 1, wherein the thruster unit is moved downward to lower the comb element to determine a separation of the structural elements from the molding member.

* * * * *